M. WATANABE.
ENTRANCE DEVICE FOR AUTOMOBILE CAR BODIES.
APPLICATION FILED JULY 30, 1920.
1,386,976.
Patented Aug. 9, 1921.
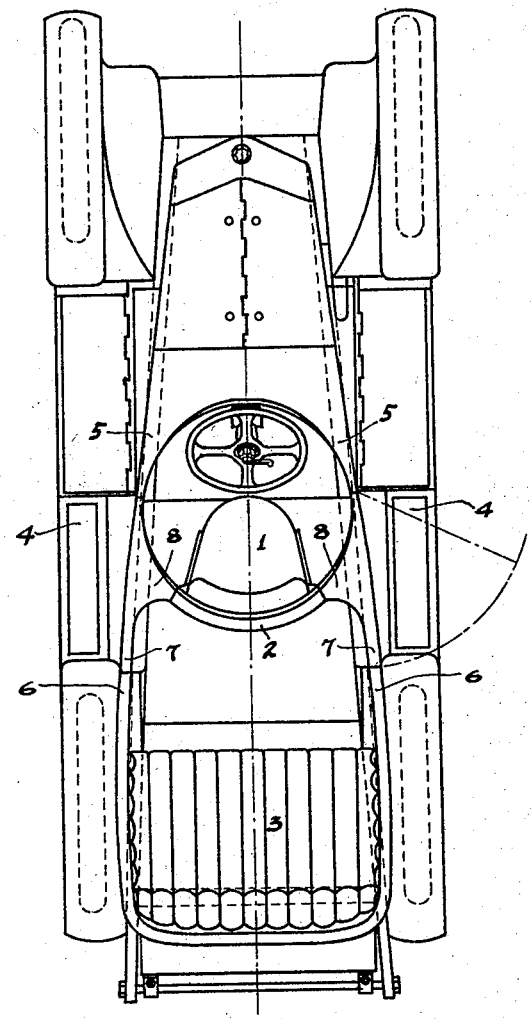

UNITED STATES PATENT OFFICE.

MASANORI WATANABE, OF TOKYO, JAPAN, ASSIGNOR TO KYOKUTO JIDOSHIA KOGYO CO., LTD., OF TOKYO, JAPAN.

ENTRANCE DEVICE FOR AUTOMOBILE-CAR BODIES.

1,386,976.     Specification of Letters Patent.     Patented Aug. 9, 1921.

Application filed July 30, 1920. Serial No. 400,094.

*To all whom it may concern:*

Be it known that MASANORI WATANABE, subject of the Emperor of Japan, residing at No. 39 Take-cho, Shitaya-ku, Tokyo, Japan, has invented certain new and useful Improvements in Entrance Devices for Automobile-Car Bodies, of which the following is a specification.

This invention relates to an improved entrance device for automobile car bodies and the object of the invention is to provide a short partition interposed between the driver's and passengers' seats and extending transversely between the side walls of the car body, doors being provided at the entrance provided in the side walls and each door having an external projection to abut and form a continuation of the end of the partition so as to render both seats readily accessible from one entrance and also to reduce the space required for the door.

My invention will be best understood by reference to the accompanying drawing which shows a plan view of an automobile car body according to the invention.

With reference to the drawing, (1) is driver's seat or front cushion on the car body, (3) is the passenger's seat or rear cushion, (2) is the partition interposed between said cushions and (4) are step boards. As may be clear from the drawing, the partition (2) is arranged transversely across the longitudinal center line and spaced from both side walls (5) and (6) where each of the side walls is cut away to form an entrance way on each side and a door (7) is hinged to the edge of cowl so as to allow the free end of said door to be continued, in closed position, to the edge of the rear side wall while the internal projection (8) of the door is abutted against the end of the partition. Thus, this invention is arranged to provide a common entrance way for both front and rear seats, to apply a single common door thereto in place of having independent doors as in previous types of vehicles, and thus simplify its construction and reduce the space required for the entrance. Owing to the short length of the partition 2 and the removal of the latter inwardly with respect to the vertical edges of the entrance in which the doors 7 are hinged, it is evident that ample space is provided both in front of and behind the partition to permit the passengers of the car or vehicle to enter or depart from either the front or rear seats, as desired. The projections 8 of the doors, when the latter are closed form a continuation of the partition 2 forming separate and distinct apartments at the front and rear of the body in which the front and sides are located respectively. If desired, the projections 8 may be in the form of boxings for the reception of tools or other articles.

Having now particularly described and ascertained the nature of this invention, what I claim is:—

1. In a vehicle, a body provided with an entrance opening, a door for said opening, a partition arranged in said body terminating inwardly of the plane of the entrance opening, seats arranged on opposite sides of the partition, and means carried by said door forming a continuation of said partition when said door is closed.

2. In a vehicle, a body provided with an entrance opening, a partition arranged in the body and terminating inwardly of the entrance opening, a door for said opening, and a projection on said door forming a continuation of the partition, when the door is closed.

3. In a vehicle, a body provided with an entrance opening, a partition arranged in the body terminating inwardly of the plane of the opening, a door for said opening, a projection on said door forming, when the latter is in closed position, a continuation of said partition, and seats arranged on opposite sides of the partition and accessible through the entrance opening.

4. In a vehicle, a body including side walls provided with entrance openings, a partition arranged transversely within the body terminating inwardly of the plane of the openings and dividing the interior of the body into separate apartments selectively accessible through the entrance openings, doors for said entrance openings, and projections carried by said doors forming, when the latter are closed, continuations of the partition.

In testimony whereof he affixes his signature in the presence of two witnesses.

MASANORI WATANABE. [L. S.]

Witnesses:
   GEUJI KURIBARA,
   S. WAKAO.